Patented July 18, 1939

2,166,297

UNITED STATES PATENT OFFICE 2,166,297

PROCESS FOR THE TREATMENT OF GELATIN AND GLUE

René Jules Fernand Jacquet, Cortenberg, Belgium, assignor to Tannerie & Maroquinerie Belges (Société Anonyme), Saventhem, near Brussels, Belgium, a corporation of Belgium No Drawing. Application July 23, 1938, Serial No. 220,985. In Belgium August 12, 1937

5 Claims. (Cl. 260—118)

The present invention relates to a method for the treatment of gelatin and glue for the purpose of decoloration and clarification.

The invention achieves these objects by simple and efficacious means, and at the same time reduces to a minimum the degradation of the gelatin and glue treated and avoids the incorporation with them of residual products derived from the reagents employed.

According to the invention, the gelatin or glue is treated in neutral solution at a temperature of from 55° C. to 75° C. with hydrated aluminium oxide and separated therefrom after the treatment is finished. Hydrated aluminium oxide is a neutral body, insoluble under the working conditions, consisting essentially of aluminium hydroxide ($Al(OH)_3$).

The manner of carrying out the process of the invention can be varied within the limits indicated in the following paragraphs:

The hydrated aluminium oxide to be mixed with the gelatin or glue can be obtained by the action of a base, sodium hydroxide (NaOH) for example, on a salt of aluminium, aluminium sulphate ($Al_2(SO_4)_3$) for example. The precipitate obtained is separated from the mother liquor by decantation or by any other mechanical means, such as centrifuging. It is then washed in such a way as to remove all soluble salts which are useless or detrimental to the process, so as to obtain a perfectly neutral product insoluble in neutral solutions of gelatin or glue. Lastly, the unnecessary excess of water is removed from the hydrated aluminium oxide by one of the means indicated above, so as to obtain a cream or paste therefrom.

The invention, while aiming expressly at the netrality of the process of decoloration and clarification, provides a certain tolerance to deal with eventual special conditions, so that, in this respect, any solution of gelatin or glue of which the pH lies between 6.5 and 7.5 may be regarded as neutral, for the purpose of this invention. It is preferable, however, that the pH be kept as near as possible to 7 by the preliminary preparation of the primary materials.

The concentration of the gelatin or glue solutions may be kept between 3% and 11%; the operating conditions are, in fact, such that the separation of the hydrated aluminium oxide, which has accomplished its decolorising action, may be satisfactorily effected by decantation or by a mechanical process such as centrifuging, leaving a product which is easily filtered, even at relatively high concentrations. After further treatment in the usual way the gelatin and glue obtained are highly decolorised and clarified.

The cream or paste of hydrated aluminium oxide is introduced, in general in an amount of from 5%–15%, calculated as dry $Al(OH)_3$, of the weight of the air-dried gelatin or glue contained in the solution. Other conditions being equal, the effect obtained depends on the quantity of the aluminium hydroxide added. The exact percentage of aluminium hydroxide relative to the dry gelatin or glue may exceed 15% where the coloration and quality of the gelatin or glue to be treated requires it.

According to the invention, the reagent may be added in bulk to the solution to be treated without fear of any unfavorable local reaction on the ultimate product owing to the insolubility of the aluminium hydroxide and the neutrality of the reacting materials.

After the introduction of the hydrated aluminium oxide into the solution to be treated, the mass is kept at a temperature between 55° C. and 75° C. and the whole is agitated from time to time in such a way as to keep the hydroxide in suspension until the maximum of decoloration is obtained. In general a maximum time of 60 minutes is sufficient. The hydroxide is then decanted or removed by centrifuging according to the concentration. The solution is thereafter filtered and converted into dry gelatin or glue in the usual way.

It is to be noted that the relatively low temperatures used according to this invention, the absence of alkalinity or of acidity of the mass and also the non-introduction of soluble salts into the gelatin or glue during the process are conditions which reduce to a minimum the degradation of the gelatin or glue treated.

As has been set forth above, the invention is based among other things on the observation that the degree of decoloration obtained is a function of the proportion of aluminium hydroxide utilised, all other conditions being chosen to avoid as far as possible the degradation of the glue or gelatin treated. The percentage of iron contained in the gelatin or glue is materially reduced at the same time.

In addition to the decoloration, the aluminium hydroxide removes by adsorption and entrainment the greater part of the substances which render the solutions of gelatin and glue turbid and thus improves their clarity.

Further, it is characteristic of the invention, that the proportion of aluminium hydroxide may vary within wide limits, since it is merely a question of introducing an insoluble neutral body into a neutral medium.

The hydrated aluminium oxide being, under the conditions set forth above, insoluble in solutions of gelatin and glue, is easily separated from the mass after the phase of agitation by one of the methods mentioned above.

What I claim is:

1. Process for decoloration and clarification of gelatin which comprises treating the gelatin with hydrated aluminum oxide in a neutral solution having a concentration of 3 to 11% and at a temperature between 55° C. and 75° C.

2. Process for decoloration and clarification of gelatin which comprises adding hydrated aluminum oxide to a solution of the gelatin having a pH between 6.5 and 7.5 and a concentration of 3 to 11%, the treatment being carried out at a temperature between 55° C. and 75° C.

3. Process for decoloration and clarification of gelatin which comprises adding neutral hydrated aluminum oxide freed from all soluble salts to a neutral solution of the gelatin having a concentration of 3 to 11%, the treatment being carried out at a temperature between 55° C. and 75° C.

4. Process for decoloration and clarification of gelatin which comprises adding a paste of neutral hydrated aluminum oxide freed from all soluble salts to a neutral solution of gelatin having a concentration of 3 to 11%, the treatment being carried out at a temperature between 55° C. and 75° C.

5. Process for decoloration and clarification of gelatin which comprises treating the gelatin in a neutral solution having a concentration of 3 to 11% with a bulk of hydrated aluminum oxide in a proportion between 5 and 15% of the weight of gelatin, and in agitating the mixture so formed from time to time to maintain the hydroxide in suspension until the decoloration and clarification is effected, the treatment being carried out at a temperature between 55° C. and 75° C.

RENÉ JULES FERNAND JACQUET.